United States Patent [19]
Barthelemy et al.

[11] Patent Number: 4,776,678
[45] Date of Patent: Oct. 11, 1988

[54] METHOD AND DEVICE FOR STABLE AND CONTROLLABLE OPTICAL PHASE MODULATION

[75] Inventors: Alain Barthelemy; Bernard Colombeau; Claude Froehly; Michel Vampouille, all of Limoges, France

[73] Assignee: Centre National de la Recherche Scientifique, France

[21] Appl. No.: 788,243

[22] Filed: Oct. 17, 1985

[30] Foreign Application Priority Data
Oct. 19, 1984 [FR] France ................ 84 16086

[51] Int. Cl.[4] .................. G02B 27/10; G02B 27/00
[52] U.S. Cl. ............................ 350/403; 332/7.51; 350/174
[58] Field of Search ............ 350/353, 354, 388, 393, 350/401, 403, 174; 372/9, 25, 71, 109; 332/7.51; 356/121; 370/1, 2, 12; 455/611

[56] References Cited

U.S. PATENT DOCUMENTS

| | | | |
|---|---|---|---|
| 3,331,651 | 7/1967 | Sterzer | 350/388 |
| 3,430,048 | 2/1969 | Rubinstein | 350/401 |
| 3,453,559 | 7/1969 | Sharp et al. | 372/9 |
| 3,521,192 | 7/1970 | De Maria et al. | 372/66 |
| 3,532,890 | 10/1970 | Denton | 350/388 |
| 3,943,457 | 3/1976 | Lehmberg | 332/7.51 |
| 4,019,151 | 4/1977 | Brueckner et al. | 350/401 |
| 4,060,769 | 11/1977 | Mallozzi et al. | 350/401 |
| 4,200,846 | 4/1980 | Stark, Jr. et al. | 372/25 |
| 4,461,543 | 7/1984 | McMahon | 350/403 |

OTHER PUBLICATIONS

Lehmberg, R. H., "Compression and Shaping of Pulses from High Power Solid State Lasers", Conf. 1973, Intern. Election Devices Meeting, Tech. Digest, Washington, D.C. USA (Dec. 3-5, 1973), pp. 565-567.

Froehly et al., "Shaping and Analysis of Picosecond Light Pulses", Progress in Optics, vol. XX, 1983, Edited by E. Wolf, pp. 123-134 & 150-153.

Ippen et al., "Self-Phase Modulation of Picosecond Pulses in Optical Fibers", App. Phys. Letts., 2-1974, pp. 190-192.

Physics Abstract, vol. 85, No. 1189, Aug. 2, 1985, p. 5108, column 1, resume 65317, London, GB; M. Vampouille et al.: "Application of Controlled Self-Focusing in CS2 to Shorten Picosecond Laser Pulses", & Opt. & Quantum Electron., GB, vol. 14, No. 3, pp. 253-261, May 1982.

Physics Abstracts, vol. 84, No. 1172, Nov. 16, 1981, p. 7639, column 2, resume 96077, London, GB; M. Vampouille et al.: "Controlled Phase Modulation in Single-Mode Optical Fibres", & Opt. & Quantum Electron., GB, vol. 13, No. 5, pp. 393-400, Sep. 1981.

*Primary Examiner*—William H. Punter
*Attorney, Agent, or Firm*—Ostrolenk, Faber, Gerb & Soffen

[57] ABSTRACT

The optical phase modulator device comprises a source of short laser pulses, a material having self-induced variation in refraction index, and an interferometer device interposed between the source of short laser pulses and the material having self-induced variation of refractive index in order to form four fragmented waves for which the average value of the correlation product is zero. The device enables stable optical phase shifts of more than $2\pi$ radians to be obtained in beams having a regular geometrical structure, and it is also applicable to high power laser amplification.

15 Claims, 2 Drawing Sheets

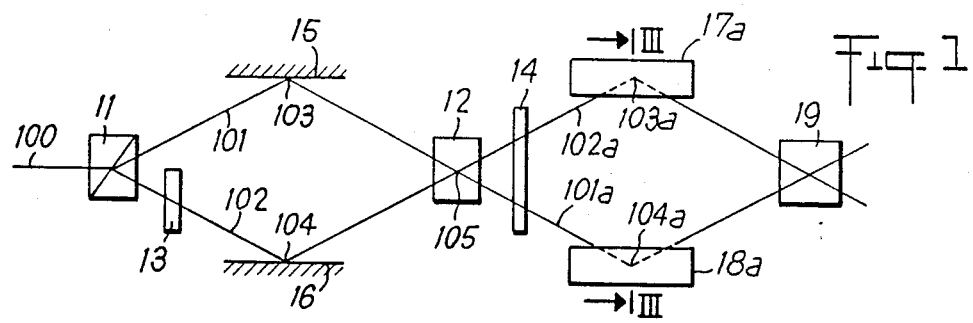
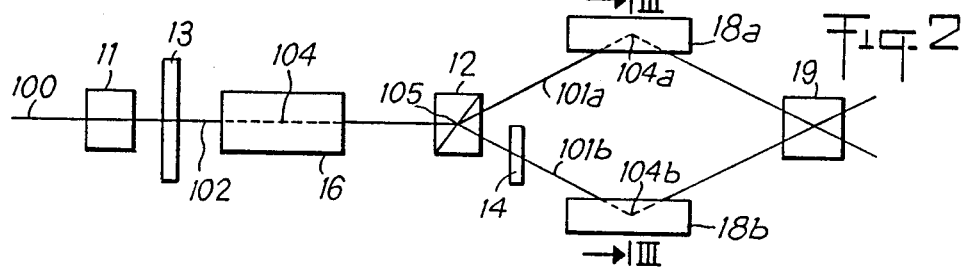
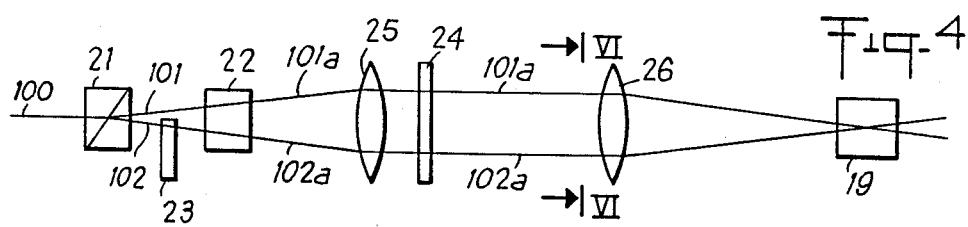
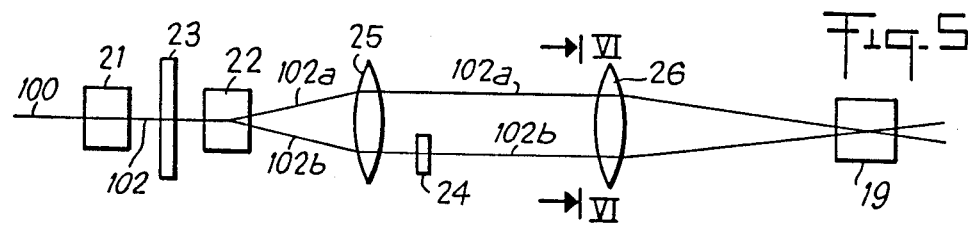
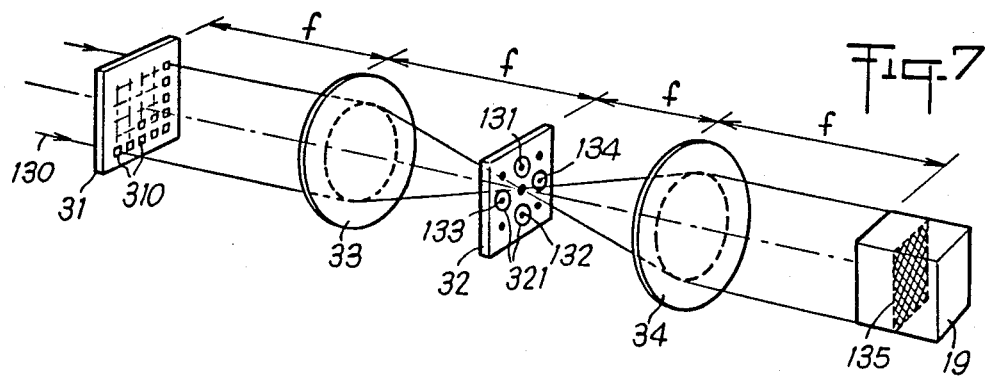

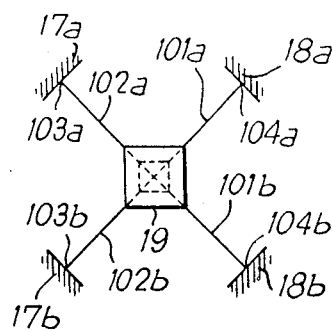
Fig. 3
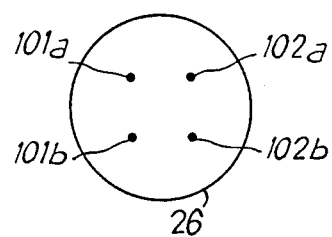
Fig. 6
Fig. 8
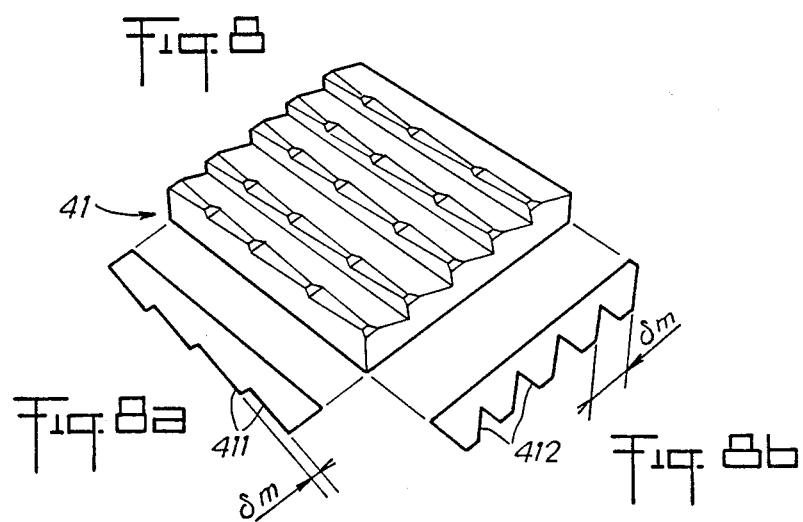
Fig. 8a    Fig. 8b

METHOD AND DEVICE FOR STABLE AND CONTROLLABLE OPTICAL PHASE MODULATION

The present invention relates to a method and a device for stable and controllable optical phase modulation of beams having a regular geometrical structure, and is particularly applicable for producing phase modulated waves having optical phase shifts of more than $2\pi$ radians, and for high gain amplification of laser radiation.

BACKGROUND OF THE INVENTION

Optical phase modulation has been carried out on plane waves of the Gaussian type, i.e. having a field intensity which is greater in the middle than near the periphery, by using the optical Kerr effect. The Kerr effect relates to the property of some materials which produce self-induced variations of refractive index when waves of different powers pass therethrough. Such non-linear propagation materials can thus be used to set up phase shifts in the plane wave as it penetrates the non-linear material.

However, when the power of the plane wave is too small, the phase shift remains less than $2\pi$ radians and is therefore too small to be applied advantageously. In contrast, when the power of the plane wave is high, self-focussing occurs within the non-linear material. This produces to an unstable and uncontrollable phase modulation phenomenon which causes the wave to explode within the material.

There is thus a problem of being able to create stable and controllable phase modulation in a light beam of sufficient magnitude without causing the light beam to explode within the non-linear material.

It was proposed, in particular in an article by M. Vampouille and J. Marty entitled "Controlled Phase Modulation in Monomode Optical Fibers" published in the journal "Optical and Quantum Electronics" No. 13, 1981 pp. 393–400, to provide controlled phase modulation by using non-Gaussian pulses which are shaped as desired by using suitable time relationships and which are transmitted along monomode and non-dispersing optical fibers.

The use of monomode optical fibers to create controlled phase modulation nevertheless represents a major constraint which greatly limits the range of applications. Monomode fibers have a very small diameter core and can therefore handle minute quantities of power without suffering damage. In some ranges of wavelength, it is no longer possible, in practice, to work only with fibers made of silica, i.e. a monomode material which is only slightly non-linear and which does not enable really interesting performance to be obtained.

The phenomenon of self-focussing of a laser beam comprising pulses whose initial durations are about 30 ps when the laser beam penetrates into a material which exhibits the optical Kerr effect has been analyzed in an article by M. Vampouille, B. Colombeau and C. Froehly entitled "The Application of Self-Focussing Control in $CS_2$ to shortening Picosecond Laser Pulses" which appeared in the journal "Optical and Quantum Electronics" No. 14, 1982, pp 253–261. Although this article provides experimental conditions for attaining the spatial distribution of the self-focussing phenomenon in non-linear optical materials and describes the characteristics of the modulation effects obtained, it fails to indicate how to avoid self-focussing of the incident plane waves which are always of the Gaussian type. The range of applications of the devices describes in this article are therefore limited. In particular, how a stable beam may be created which propagates in a perfectly controlled manner with non-linear phase shifts of greater than $2\pi$ radians is not taught by the prior art.

It is an object of the present invention to provide controlled and stable phase modulation of a beam having a regular geometrical structure by enabling phase shifts of greater than $2\pi$ radians to be obtained.

Another object of the invention is to provide high gain amplification of beams while maintaining a regular geometrical structure and avoiding critical self-focussing problems.

SUMMARY OF THE INVENTION

The present invention provides a method of optical phase modulation of beams having regular geometrical structures. According to the invention the beam is fragmented into regular cells. The regular cells are obtained by splitting of the input radiation beam into several identical secondary beams and controlling the path of the secondary beams in such a manner as to cause the beams to arrive with different directions and to cause their superposition inside a non-linear material into which the secondary beams are directed. Further, the path of the secondary beams is controlled in such a manner that upon becoming superposed within the non-linear material, the secondary beams produce a field pattern divided along the aforementioned regular cells by the modulation of two-dimensional interference fringes arising from the superposition of the secondary beams. The fragmented beam cells are then propagated through a material having a self-induced variation in refractive index.

The fragmented beams are derived from a laser beam which is passed through an interference device or a device which produces space modulation.

The laser beam is delivered from a locked mode laser source in order to obtain phase shifts which vary as a function of space and of time in accordnce with a known predetermined manner.

Advantageously, the interference device uses birefringence to divide the amplitude of the laser beam to form four waves for which the average value of the correlation product is zero i.e. the waves are not correlated.

In a particular embodiment, a beam of regular geometrical structure is fragmented by means of a crossed dispersion system producing an image via an afocal system. As is well known, an afocal system is an optical system of zero convergent power and a corresponding afocal lens in a lens zero convergent power, whose focal points are practically infinite.

In another embodiment, a beam of regular geometrical structure is fragmented by space frequency filtering using a bidirectional diffraction pattern.

The invention also provides a device for stable and controllable phase modulation comprising a source of short laser pulses and a material which exhibits self-induced variation in refractive index, the device including the improvement whereby it further comprises devices such as interferometer devices or masking devices. The device used is interposed between the source of short laser pulses and the material having self-induced variation of refractive index in order to form four fragmented waves for which the average value of the correlation product is zero.

In a first embodiment, the interferometer comprises a first Wollaston prism having a wide angle of deflection interposed on the path of the main pulsed wave emitted from the laser source to split the main pulsed wave first into two secondary and diverging waves which are situated in a first plane $P_1$. A halfwave plate is dipsoed on the path of one of the two secondary waves. First and second mirrors are disposed on the paths of the two secondary waves perpendicularly to the first plane $P_1$ to cause said divergent secondary waves to converge. A second Wollaston prism having a large angle of deflection is placed at the point of convergence of the two secondary waves to split each of the two secondary waves in planes perpendicular to the first plane $P_1$, thereby creating a set of four diverging tertiary waves. A second halfwave plate is disposed on the path of two of the four diverging tertiary waves and third, fourth, fifth and sixth mirrors ae placed on the paths of the four diverging tertiary waves at an angle relative to the first and second mirrors such as to cause the four tertiary waves to converge in the material which exhibits the self-induced variation of refractive index.

In another embodiment, the interferometer device comprises a first Wollaston prism of small deflection angle interposed on the path of the main pulsed wave emitted by the laser source, to split the main pulsed wave a first time into two slightly diverging secondary waves situated in a first plane $P_1$. A halfwave plate is disposed on the path of one of the two secondary waves and a second Wollaston prism of small deflection angle is placed on the path of the two secondary waves to split each of the two secondary waves in planes perpendicular to the first plane $P_1$ such as to create a set of four slightly divergent tertiary waves. A second halfwave plate disposed on the path of two of the four tertiary waves and an afocal optical system is placed on the paths of the four slightly divergent tertiary waves in order to cause the four tertiary waves to converge in the material which has the self-induced variation of refractive index.

In yet another embodiment, the phase modulation device comprises a masking device constituted by the following items in succession: a binary mask comprising a grid of openings disposed in a checkerboard pattern; a first converging lens; a space filter provided with a set of four openings disposed in a cross formation; and a second converging lens for forming a network of fringes in the material having self-induced variation of refractive index.

In this case, the binary mask and the filter are situated in the focal planes of the first converging lens, and the filter and the material having the self-induced variation of refractive index are situated in the focal planes of the second converging lens.

In yet another embodiment, the phase modulation device comprises a four-wave masking device constituted of a two-dimensional diffraction grating operating by reflection or by transmission, and an afocal optical system for forming a network of fringes in the material having self-induced variation of refractive index.

In applying the method according to the invention to amplify laser radiation in order to obtain a high gain in beams of regular geometrical structure, the material having self-induced variation of refractive index is comprised of an amplifying material.

Advantageously, the fragmented wave provides the transverse intensity distribution of a propagation mode of the light guide constituted by the amplifying material.

The amplifying material may be a YAG; Nd crystal or a bar of doped glass (eg. by neodymium) which is cut in such a manner as to provide a light guide of a square section.

Preferably, in applying the method to amplify laser radiation, the fragmented beam is produced from a laser beam to be amplified by passing the laser beam through an interference device, and the interference device uses birefringence to divide the amplitude of the laser beam into four waves for which the average value of the correlation product is zero.

In another embodiment, of amplifying a laser beam, a beam of regular geometrical structure is fragmented by means of a crossed dispersion system producing an image through an afocal system.

In all cases where the present invention is applied to laser amplification, it serves to prevent destructive self-focussing in the amplifier bar of a power laser amplifier chain.

BRIEF DESCRIPTION OF THE DRAWINGS

Embodiments of the invention are described by way of example with reference to the accompanying drawings, in which:

FIG. 1 is a diagrammatic plan view of a first four-wave interferometer device usable in a device in accordance with the invention;

FIG. 2 is a diagrammatic side view of the device of FIG. 1;

FIG. 3 is a section view on line III—III of FIGS. 1 and 2;

FIG. 4 is a diagrammatic plan view of a second four-wave interferometer device in accordance with the invention;

FIG. 5 is a diagrammatic side view of the device of FIG. 4;

FIG. 6 is a section view on line VI—VI of FIGS. 4 and 5;

FIG. 7 is a perspective view of a space frequency filtering device;

FIG. 8 is a perspective view of a two-directional diffraction grating capable of being substituted for the mask in the FIG. 7 filter device; and FIGS. 8a and 8b respectively provide a front view and a side view of the two-directional diffraction grating of FIG. 8.

MORE DETAILED DESCRIPTION

FIGS. 1 to 3 show a four-wave interferomatic device which receives a main wave 100 of coherent light from a laser source (not shown) which is preferably a source of the locked mode laser type. The main beam 100 is applied to a first Wollaston prism 11 having a large deflection angle and acting as a two-beam polarizer which splits the incident beam 100 to form two divergent secondary beams 101 and 102 of polarized light having a reduced amplitude as compared to the amplitude of the main wave 100. A halfwave plate 13 is disposed on the path of one of the two secondary waves 101 and 102, eg. the secondary wave 102, in order to cause the orthogonal polarizations created by the Wollaston prism 11 to be parallel.

The diverging secondary waves 101 and 102 are then reflected at points 103 and 104 by plane mirros 15 and 16 respectively, which mirrors are parallel to and face each other insofar as they are disposed perpendicularly to the plane $P_1$ defined by the secondary waves 101 and 102 and are symmetrical about the main wave 100. Thereby the mirrors 15 and 16 focus the secondary waves 101 and 102 at point 105 where a second Wollaston prism 12 having a wide deflection angle is placed.

The second Wollaston prism 12 is disposed perpendicularly to the first Wollaston prism 11 and serves to double up each of the secondary waves 101 and 102 to create a total of four tertiary waves 101a, 101b, 102a, and 102b therefrom in planes perpendicular to the plane $P_1$ of FIG. 1. A second halfwave plate 14 is disposed on the paths of tertiary waves 101b and 102b, while the tertiary waves 101a and 102a are allowed to continue unhindered. The second halfwave plate 14 is intended to act in a manner analogous to the first halfwave plate 13 to bring the orthogonal polarizations created by the second Wollaston prism 12 into parallelism in a single plane in each of the planes defined by the rays 101a, and 101b, or 102a and 102b. The tertiary waves 101a, 101b, 102a, and 102b, which diverge from the second Wollaston prism 12 are then reflected at points 103a, 103b, 104a, and 104b on plane mirrors 17a, 17b, 18a, and 18b (FIG. 3) disposed along the sides of a square and inclined at an angle of 45° relative to the planes of the mirrors 15 and 16. The reflected tertiary waves 101a, 101b, 102a, and 102b, then converge in a non-linear optical material 19, eg. carbon disulfide, in order to create interference fringes which give rise to stable phase shifts at the outlet from non-linear material 19.

By way of example, the distance between the first and second Wollaston prisms 11 and 12 may be about 50 cm, while the distance between the second Wollaston prism 12 and the non-linear material 19 may be about 1 meter (m).

FIGS. 4 to 6 show a four-wave interferometric device which is somewhat similar to the device shown in FIGS. 1 to 3, but which makes use of first and second Wollaston prisms 21 and 22 which have small deflection angles. The second Wollaston prism 22 may thus be placed immediately after the first halfwave plate 23 which is placed after the first Wollaston prism 21 on the path of one (102) of the two secondary polarized waves 101 and 102 created by fitting the main wave 100 in the first Wollaston prism 21. The second Wollaston prism 22 is thus placed on a portion of the secondary wave 101 and 102 where they diverge slightly in order to split the secondary waves 101 and 102 in planes which are perpendicular to the plane of FIG. 4 in order to form four diverging tertiary waves 101a, 101b, 102a, and 102b. (FIG. 6)

In afocal system comprising two converging lenses 25 and 26 serves to obtain parallel beams between the two lenses 25 and 26 and to cause the four tertiary waves 101a, 101b, 102a, and 102b to converge in the non-linear material 19 placed downstream from the second lens 26. A second halfwave plate 24 is also interposed on the path of the tertiary waves 101b and 102b after the lens 25 in order to ensure that all of the tertiary waves are polarized in the same direction. The afocal reducing system 25, 26 transposes the vertical interference formed from the four tertiary waves into the non-linear material 19. The afocal system is designed in such a manner as to avoid creating any real focus point in the air in order to avoid the air being ionized, given the extremely high powers which may be used (eg. about a gigawatt). It may be observed that the device shown in FIGS. 1 to 3 also avoids creating focus points in the air between the second Wollaston prism 12 and the non-linear material 19 because of the way it uses mirrors 17a, 17b, 18a, and 18b. The volume occupied by the device which includes mirrors is nonetheless somewhat larger than that occupied by the device using an afocal lens system.

FIG. 7 shows a device representative of another mode of implementing a wave whichis split up into regular cells. Instead of the interferometric systems of FIGS. 1 to 6, a mask 31 is used which has square openings 310 disposed in a regular checkerboard pattern in order to constitute a grid with the mask being placed on the path of the main beam 130 emitted from a laser source (not shown). The mask 31 is placed in the object focal plane of a first converging lens 33 whose image focal plane contains a filter 32 having four openings 321 disposed in a cross configuration so as to pass only four light spots 131, 132, 133, and 134 from the multiplicity of the spots created by the grid 31. A second converging lens 34 has the filter 32 in its object focal plane and has its image focal plane located in the front face of the non-linear material 19 in order to form, within the non-linear material 19, an image of the two-dimensional light superposition provided by the mask 31, with the presence of fringes which correspond to the production of stable phase shifts at the outlet from the non-linear material 19.

It may be observed that FIG. 7 shows lenses 33 and 34 having the same focal length. However, this is not essential and lenses having different focal lengths could also be used.

The arrangement shown in FIG. 7 causes a certain amount of energy to be lost at the filter 32, but has the advantage of creating a wave which is fragmented into regular cells in a very simple manner.

By way of variant on the FIG. 7 assembly, and in order to avoid the need to use the filter 32, the mask grid 31 could be replaced by a crossed dispersion system constituted by a two-dimensional diffraction grating 41, which grating may operate by reflection or by transmission, and which could be of the type shown in FIGS. 8, 8a, and 8b, for example. The grating 41 is ruled in two directions, and has a first series of grooves 411 having a first depth and a first pitch, and a second series of grooves 412 having a second depth and a second pitch.

The various devices described above enable phase shifts to be obtained at the outlet from the non-linear material 19 which are greater than $2\pi$ radians while nevertheless providing a stable light beam which progresses in a controlled manner. This is due to the fact that unlike prior art devices in which a Gaussian type plane wave is directly applied to the non-linear material (i.e. devices having self-induced variation in refractive index), in accordance with the invention a set of waves fragmented into regular cells are applied to the non-linear materials. The waves may be formed by splitting up the amplitude of a source wave in a birefringence medium, or else obtained by space filtering.

Numerous and various applications are made possible by this mastery of the phase of a light beam, and in particular it is possible to control the characteristics of an optical component as a function of time using an external light beam, or to control one light beam by another without loss and in real time, with a reaction time of about 1 picosecond.

In an important application of the invention, the interferometer devices shown in FIGS. 1 to 6 may be disposed on the path of a laser beam for the purpose of attaining very high laser power amplification. In this case, the material 19 is constituted of an amplifying material which behaves as a material having a non-negligible non-linearity when the intensity of the laser beam is high.

The fragmentation of the incident laser beam provided within the interferometric device makes it possible to increase the power which the wave can convey without giving rise to critical self-focussing problems within the amplifying material. Consequently, for a given size of amplifier bar, the power to which the amplified beam may be raised is considerably greater than the power which can be obtained without an interferometric device serving to fragment the incident wave into regular cells. Thus, an amplifier device in accordance with the invention may include an amplifier bar which is very long and which has a regular small cross-section, unlike prior art laser amplifier devices which, in order to increase gain are required to include a bar in the shape of a short disk of large diameter in order to reduce the power density and to avoid self-focussing.

More particularly, in a very high power laser amplifier device in accordance with the invention, the stability of wave propagation within the amplifier bar is improved by choosing the thickness of the amplifier bar as a function of the width of the interference fringes. An intensity distribution is thus set up which corresponds to a propagation mode of the light guide constituted by the amplifier medium, thereby avoiding having the fringes present on the edges of the bar.

The amplifier medium is cut in such a manner as to provide a light guide for increasing the length of the interaction of the beam with the amplifier medium. The fragmented beams are thus confined within the amplifier medium and are restituted at the outlet from this amplifier medium after a light-matter interaction has taken place over a great length without developing any self-focussing.

It is naturally possible to provide an amplifier chain by arranging a plurality of amplifier bars in cascade one after another.

In order to avoid excessive attenuation of the initial laser beam when it is desired to amplify a laser beam, it is preferable to interpose an interferometric device between the laser source and the amplifier medium 19, eg. as shown in FIGS. 1 and 2 or as shown in FIGS. 3 and 4. The periodic space modulation device shown in FIG. 7 is rather less well adapted to this application insofar as it requires two space frequency filters and thus absorbs more energy.

What is claimed is:

1. A device for producing stable and controllable optical phase modulation, the device comprising a source of short laser pulses and a material having self-induced variation in refractive index, the device including the improvement whereby it further comprises a device selected from the group constituted by interferometer devices and masking devices, which device is interposed between the source of short laser pulses and the material having self-induced variation of refractive index in order to form four fragmented waves for which the average value of the correlation product is zero.

2. A method of directing radiation to a non-linear medium whose refractive index varies with the power density of an input beam passing therethrough, wherein the input beam breaks up from self-focussing whenever its power exceeds a given critical power associated with the non-linear medium, comprising the steps of:
   producing at least three identical secondary beams by splitting of an input radiation beam having a given radiation spatial profile;
   directing said secondary beams into said non-linear medium;
   controlling the path of each secondary beam in such a manner as to cause the secondary beams to arrive with different directions and to cause their superposition inside the non-linear medium;
   controlling the path of each secondary beam such that the paths are equal in length, and such that the secondary beams are superposed to provide a field pattern divided in regular cells by the modulation of two-dimensional interference fringes; and
   controlling the angle between the secondary beams in such a way that each cell built by the field pattern carries a power lower than the given critical power of the non-linear medium; whereby the total power of radiation directed through the non-linear medium may exceed the critical power and induce a temporal phase modulation of more than $2\pi$ radians without adversely affecting the given radiation spatial profile.

3. A method according to claim 2, wherein said medium comprises a material having a self-induced variation in refractive index, said material is carbon disulfide ($CS_2$).

4. A method according to claim 2, comprising the step of passing a laser beam through an interference device to obtain said splitting of the input beam into secondary beams whose superposition provides a field pattern divided in regular cells.

5. A method according to claim 2, comprising the step of passing a laser beam through a device which produces periodic space modulation to obtain said splitting of the input beam into secondary beams whose superposition provides a field pattern divided in regular cells.

6. A method according to claims 4 or 5, comprising the step of using a locked mode laser source for obtaining the input laser beam.

7. A method according to claim 4, comprising using birefringence in the interference device to divide the amplitude of the laser beam to form four uncorrelated waves.

8. A method according to claim 2, comprising splitting the beam by space frequency filtering using bidirectional diffraction.

9. A method according to claim 2, wherein said splitting of said beam is carried out by means of a crossed dispersion system producing an image via an afocal system.

10. A device for producing stable and controllable optical phase modulation, comprising:
   means for receiving short laser pulses;
   a material having self-induced variation in refractive index; and
   a laser pulse fragmenting device interposed between said means for receiving laser pulses and said material and being effective for forming four fragmented waves having a zero average correlation product, said fragmenting device being positioned to enable said fragmented waves to pass into said material.

11. A device according to claim 10 wherein the fragmenting device comprises a first Wollaston prism having a wide angle of deflection interposed on the path of the main pulsed wave emitted from the laser source to split the main pulsed wave into two secondary and diverging waves which are situated in a first plane $P_1$, a halfwave plate disposed on the path of one of the two secondary waves, first and second mirros disposed on the paths of the two secondary waves perpendicularly to said first plane $P_1$ to cause said divergent secondary waves to converge, a second Wollaston prism having a large angle of deflection disposed at the point of convergence of the two secondary waves to split each of the two secondary waves in planes perpendicular to said first plane $P_1$, thereby creating a set of four diverging tertiary waves, a second halfwave plate disposed on the path of two of the four diverging tertiary waves and third, fourth, fifth and sixth mirrors placed on the paths of the four diverging tertiary waves at an angle relative to the first and second mirrors such as to cause the four tertiary waves to converge in the material having self-induced variation of refractive index, said fragmenting device comprising an interferometer.

12. A device according to claim 10 wherein the fragmenting device comprises a first Wollaston prism of small deflection angle interposed on the path of the laser pulses, to split the laser pulses into two slightly diverging secondary waves situated in a first plane $P_1$, a halfwave plate disposed on the path of one of the two secondary waves, a second Wollaston prism of small deflection angle placed on the path of the two secondary waves to split each of the two secondary waves in planes perpendicular to the first plane $P_1$ in such a manner as to create a set of four slightly divergent tertiary waves, a second halfwave plate disposed on the path of two of the four tertiary waves, and an afocal optical system placed on the paths of the four slightly divergent tertiary waves in order to cause the four tertiary waves to converge in the material having self-induced variation of refractive index, said fragmenting device comprising an interferometer.

13. A device according to claim 10, wherein said fragmenting device includes a four wave masking device constituted by the following items in succession: a mask comprising a grid of openings having a checkerboard pattern; a first converging lens; a space filter provided with a set of four openings disposed in a cross formation; and a second converging lens for forming a network of fringes in the material having self-induced variation of refractive index.

14. A device according to claim 13, wherein the mask and the filter are situated in the focal planes of the first converging lens, and the filter and the material having self-induced variation of refractive index are situated in the focal planes of the second converting lens.

15. A device according to claim 10 further including a four-wave masking device consituted by a two-dimensional diffraction grating operating by reflection or by transmission, and an afocal optical system for forming a network of fringes in the material having self-induced variation of refractive index.

* * * * *